US010240968B2

United States Patent
Koller et al.

(10) Patent No.: US 10,240,968 B2
(45) Date of Patent: Mar. 26, 2019

(54) DIFFERENTIAL MEASUREMENT CIRCUIT, AND BALANCE WITH FORCE COMPENSATION

(71) Applicant: Mettler-Toledo GmbH, Greifensee (CH)

(72) Inventors: David Koller, Zürich (CH); Cyrill Bucher, Fehraltdorf (CH); Christoph Trautweiler, Regensdorf (CH)

(73) Assignee: Mettler-Toledo GmbH, Greifensee (CH)

( * ) Notice: Subject to any disclaimer, the term of this patent is extended or adjusted under 35 U.S.C. 154(b) by 109 days.

(21) Appl. No.: 15/434,276

(22) Filed: Feb. 16, 2017

(65) Prior Publication Data

US 2017/0234720 A1 Aug. 17, 2017

(30) Foreign Application Priority Data

Feb. 17, 2016 (EP) ..................................... 16156026

(51) Int. Cl.
*G01G 9/00* (2006.01)
*G01G 19/414* (2006.01)
*G01G 7/04* (2006.01)

(52) U.S. Cl.
CPC .................. *G01G 9/00* (2013.01); *G01G 7/04* (2013.01); *G01G 19/414* (2013.01)

(58) Field of Classification Search
CPC ........... G01G 9/00; G01G 7/04; G01G 19/414
(Continued)

(56) References Cited

U.S. PATENT DOCUMENTS 3,727,708 A 4/1973 Adler et al.
4,420,055 A * 12/1983 Grutzediek ............ G01G 7/045
177/212
(Continued)

FOREIGN PATENT DOCUMENTS

DE 2311676 A1 9/1974
DE 2742146 A1 3/1979
(Continued)

*Primary Examiner* — Natalie Huls
*Assistant Examiner* — Monica S Young
(74) *Attorney, Agent, or Firm* — Standley Law Group LLP

(57) ABSTRACT

A differential measurement circuit (1) is implemented in a balance with electromagnetic force compensation. The circuit receives input from two photo currents ($I_1$, $I_2$) generated by photodiodes (D1, D2) and generates an output signal proportional to their difference. A switch (SW) controls the flow of current through a node ($K_A$) to which the two photo currents are directed, by flipping between two states ($z_{t1}$, $z_{t2}$) within two phases ($t_1$, $t_2$) of a time period T. The switch is controlled so a reference current ($I_{Ref}$) from a voltage or current source ($U_{Ref}$) is superimposed alternatingly within the time phases on one of the two photo currents which continuously flow into the node. The node lies at the input of an integrator (INT) whose integrator signal ($s_{INT}$) can be compared in a comparator (CMP) to a cyclically recurring ramp signal ($s_{RAMP}$) which conforms to the time period. At the output of the comparator, a rectangular-shaped comparator signal ($s_{PWM}$) can be generated whose duty cycle ratio is defined by the intersection of the integrator signal with the ramp signal and which can be directed to a control input of the switch.

19 Claims, 7 Drawing Sheets

(58) Field of Classification Search
 USPC ........................................................ 177/25.13
 See application file for complete search history.

(56) References Cited

U.S. PATENT DOCUMENTS

| | | | | |
|---|---|---|---|---|
| 4,489,800 A * | 12/1984 | Nufer | ........................ | G01G 7/04 |
| | | | | 177/210 EM |
| 4,549,623 A * | 10/1985 | Baumann | ................. | G01G 7/02 |
| | | | | 177/210 EM |
| 2005/0081650 A1* | 4/2005 | Bucher | ................ | G01G 3/1418 |
| | | | | 73/862.623 |
| 2008/0042043 A1* | 2/2008 | Reime | ....................... | G01V 8/20 |
| | | | | 250/205 |
| 2008/0053249 A1* | 3/2008 | Reber | ...................... | G01G 7/04 |
| | | | | 73/862.69 |
| 2012/0286775 A1* | 11/2012 | Yuan | .................. | G01R 33/0041 |
| | | | | 324/244.1 |
| 2013/0220711 A1* | 8/2013 | Beguin | .................... | G01G 7/04 |
| | | | | 177/210 EM |

FOREIGN PATENT DOCUMENTS

| | | | |
|---|---|---|---|
| DE | 10153603 A1 | 5/2003 | |
| DE | 202012012781 U1 | 1/2014 | |
| JP | 59-231421 A | 12/1984 | |

* cited by examiner

DIFFERENTIAL MEASUREMENT CIRCUIT, AND BALANCE WITH FORCE COMPENSATION

CROSS-REFERENCE TO RELATED APPLICATIONS

This application is entitled to benefit of a right of priority from European Patent Application No. 16156026.3, filed on 17 Feb. 2016. The content of that application is incorporated by reference as if fully recited herein.

TECHNICAL FIELD

The invention relates to a differential measurement circuit for a balance with electromagnetic force compensation, as well as a balance with electromagnetic force compensation.

BACKGROUND

A balance with electromagnetic force compensation which includes a controller device with a differential measurement circuit belongs to the know state of the art and is disclosed for example in [1], DE 101 53 603 A1. The balance described there and as illustrated hereinafter in FIG. 1 includes a cup-shaped permanent magnet system 109 with an air gap in which a coil is arranged. The latter is connected to a movable measurement lever 106 and conducts the flow of a compensating current $I_{comp}$ whose magnitude depends on a force which is acting on the measurement lever 106. The position of the measurement lever 106 is measured by means of an optoelectronic measurement device 111 which is connected to a controller device 10' that regulates the compensating current $I_{comp}$ in response to the incoming measurement signals in such a way that the measurement lever 106 is always held at a constant position or is returned to the same position after a change of the load.

The permanent magnet system 109 is arranged in a console 104 which is connected through flexure pivots 103a by way of parallel-guiding members 103 to a hanger 101 which includes a cantilevered extension 101a serving to receive a load to be measured. The vertical component of the force generated by the load is transmitted from the hanger 101 through a coupling 105 to the measurement lever 106 which is suspended at a part 104b of the console 104 by means of a flexure fulcrum 107.

To measure the position of the measurement lever 106, the optoelectronic measurement device 111 includes two photodiodes D1, D2 which are arranged opposite a light-emitting diode D3 on the inside of an angular bracket 104a that is attached to the console 104. The space between the photodiodes D1, D2 and the light-emitting diode D3 is traversed by an end section 106b of the measurement lever 106 which is configured as a light barrier or slotted aperture vane and includes an aperture slot 106a, so that radiation emitted by the light-emitting diode D3 can pass, dependent on the position of the light barrier, through the aperture slot to the photodiodes D1, D2 which generate corresponding photo currents $I_1$ and $I_2$ as inputs to the controller device 10'. When the measurement lever 106 is deflected out of its initial position or normal position, either the first or the second photodiode D1, D2 receives more radiation, and as a result, the controller device 10' receives photocurrents $I_1$ and $I_2$ of unequal magnitude.

The controller device 10' includes a differential measurement circuit 1' which, based on the two currents $I_1$ and $I_2$, generates a differential voltage $u_A$ which vanishes in the case where the photo currents $I_1$ and $I_2$ are equal. The differential voltage $u_A$ is directed to a driver circuit 2 that follows downstream in the circuit path and causes a corresponding compensating current $I_{comp}$ to flow by way of a reference resistor 3 through a coil 110, whereby a counterforce is generated which corresponds to the load and returns the measurement lever 106 to the initial position. The voltage generated across the reference resistor 3 by the compensating $I_{comp}$ is received by a converter module A/D and converted to a corresponding digital value which is presented on a display unit DSP.

Further examples of differential measurement circuits that can be used to produce a differential signal out of two signals coming from two photodiodes are disclosed for example in [2] U.S. Pat. No. 3,727,708 and [3] DE 2 311 676.

A contact-free displacement transducer producing a voltage signal which is described in reference [3] includes a differential photodiode consisting of two individual diodes, designed to receive optical radiation passing through the slot of a movable light barrier vane, for example the slot 106a in the end section 106b of the measurement lever 106. In this circuit arrangement, the photo currents generated by the photodiodes are directed, respectively, to a first and a second operational amplifier which produce voltages that are proportional to the photocurrents and are applied to the input terminals of a third operational amplifier which, in turn, delivers a differential signal at its output terminal which is proportional to the difference of the output voltages of the first two operational amplifiers and proportional to the displacement distance of the aperture slot.

To generate the differential signal, the differential circuits described in [2] and require several resistors and operational amplifiers whose temperature- and operating behavior can have a detrimental effect on the resultant differential signal, whereby measurement errors can be caused in a balance with electromagnetic force compensation. Operational amplifiers often have undesirable offset voltages which, like resistors, can be subject to disturbing fluctuations in the presence of an often unstable ambient temperature.

The differential measurement circuit 1' illustrated in FIGS. 2a and 2b which is designed to receive the photo currents $I_1$, $I_2$ generated by the photodiodes D1, D2 has been proposed in [1] as a way to avoid the drawbacks of the circuit arrangements disclosed in [2] and [3]. The differential measurement circuit 1' generates an output signal $u_A$ which is proportional to the difference of the photo currents $I_1$, $I_2$ and is largely independent of fluctuations of the ambient temperature. To accomplish this, a switch SW which is connected to the two photodiodes D1, D2 and the inverting input of a first operational amplifier $OA_A$ is periodically flipped by a controller unit CTRL between two states $z_{t1}$, $z_{t2}$. As a result, in the first state $z_{t1}$ during a first phase $t_1$ of the period, the inverting input of the first operational amplifier $OA_A$ is connected through a first node $K_A$ to the first photo current $I_1$; and in the second state $z_{t2}$ during a second phase $t_2$ of equal length, the inverting input of the first operational amplifier $OA_A$ is connected through the first node $K_A$ to the second photo current $I_2$. The output terminal of the first operational amplifier $OA_A$ at which the output signal $u_A$ is generated is connected back to the inverting input by means of a resistor $R_A$ running parallel to a capacitor $C_A$ so that the operational amplifier $OA_A$ works as a time-delayed proportional controller.

The inverting input of a second operational amplifier $OA_\Sigma$ which is connected to a second node $K_\Sigma$ receives a reference current $I_0$ from a reference voltage source $U_0$ by way of a reference resistor $R_0$, so that at the output of the further operational amplifier $OA_\Sigma$ a summation voltage $U_\Sigma$ establishes itself dependent on the difference between the photo currents $I_1$, $I_2$ flowing during the first phase of the time period and the reference current $I_0$ flowing during the first and second phase of the time period, wherein the summation voltage $U_\Sigma$ depends on the respective magnitudes of the reference current $I_0$ and the photo currents $I_1$, $I_2$. The second operational amplifier $OA_\Sigma$, whose output is connected by way of a capacitor $C_\Sigma$ to the inverting input, works as an integrator. By regulating the operating voltage of the light-emitting diode D3 dependent on the summation voltage $u_\Sigma$ the photo currents $I_1$, $I_2$ are kept constant.

In the circuit arrangement according to [1], which is of a relatively simple design, the photo currents $I_1$, $I_2$ are applied to the differential circuit 1' sequentially. Consequently, the difference is established with a corresponding delay and the information of the photo current $I_1$ or $I_2$ that was not connected in the respective time phase is lost. A further delay is caused by the first operational amplifier $OA_A$ which operates as a time-delayed proportional controller. Furthermore, the voltage at the cathodes of the photodiodes D1, D2 is not defined and may change at the flip of the switch SW. The symmetry of the circuit, wherein the first photo current $I_1$ flows through the virtual mass at the inverting input of the second operational amplifier $OA_\Sigma$ while the second photo current $I_2$ flows through the actual mass at the anode of the second photodiode D2, is not assured.

Balances with electromagnetic force compensation of the kind described above have reached a high level of technical maturity. The applied technology is simple and efficient. Consequently, any progress in this technology can only be realized with a considerable effort.

The present invention therefore has the objective to provide an improved differential measurement circuit for a balance with electromagnetic force compensation as well as an improved balance with electromagnetic force compensation.

The aim is in particular to provide a differential measurement circuit which has on the one hand a simple design configuration and on the other hand delivers a precise output signal quickly and reliably.

The differential measurement circuit should maintain a stable operating behavior under all possible conditions independent of switching status. The individual components should be working with defined operating parameters that are not affected by switching processes. The goal of the invention is a simple symmetric circuit arrangement that is resistant to extraneous disturbances.

Where photodiodes are used, the circuit should be designed to allow them to constantly work within an ideal operating range. The switching of photo currents which could cause disturbances should preferably be avoided.

A loss of information in the evaluation of the measurement signals should be avoided.

Furthermore, the circuit should deliver an output signal that is advantageously suited for further processing.

The balance with electromagnetic force compensation according to the invention should be capable of being adapted to different fields of application, in particular with a view to improvements in counteracting disturbances occurring in the different fields of application and further improving the measurement results.

SUMMARY

These tasks are solved by a differential measurement circuit for a balance with electromagnetic force compensation as well as by a balance with electromagnetic force compensation with the features set forth in claim 1 and claim 12. Advantageous embodiments of the invention are described in further claims.

The differential measurement circuit, which is designed for use in a balance with electromagnetic force compensation and which can accept two photo currents generated by photodiodes as inputs and generate an output signal that is proportional to the difference of the photo currents, includes a switch which within two phases of a time period can be flipped between two states in order to control the flow of current through a node to which the two photo currents are connected.

In accordance with the invention, the switch can be controlled in such a way that a reference current delivered by a voltage source or a current source can be superimposed alternatingly within the time phases on one of the two photo currents which continuously arrive at the node. The node lies at the input of an integrator whose integrator signal can be compared in a comparator to a cyclically recurring ramp signal which conforms to the aforementioned time period, while at the output of the comparator a comparator signal can be generated in the shape of a square wave whose duty cycle ratio is defined by the intersection of the integrator signal with the ramp signal and which can be applied to the control input of the switch.

Thus, in accordance with the invention, the photo currents are not alternatingly switched on and off. Instead, both photo currents are used continuously. Accordingly, the available information which indicates the position of a light barrier admitting light to the two photo diodes can be used without interruption.

As a result of the switching action, a reference current is alternatingly superimposed on the two photo currents. During the first phase of a period, the reference current is superimposed on the first photo current, and during the second phase of a period, the reference current is superimposed on the second photo current. The critical photo currents themselves are not switched, but the switching occurs in the non-critical reference current. This is the reason why disturbances are avoided and the symmetry of the circuit is always preserved.

The differential measurement circuit of the invention has such a high degree of stability that no dedicated reference current source is needed to provide the reference current. The reference current can be routed advantageously through a reference resistor which is connected to the operating voltage of the circuit arrangement.

It is further advantages that the electrodes of the photodiodes are not being switched. Instead, the cathodes of the photodiodes are connected to a common operating potential, for example a stable operating voltage. The photodiodes can be conventionally arranged in the circuit in such a way that they work in a preferred range of their operating characteristics, which may include a biasing voltage.

In a preferred embodiment, the first electrode, for example the anode, of the first photodiode, is connected directly to the node. In contrast, the first electrode or anode of the second photodiode is connected to the node by way of an inverter in which the second photo current is inverted. The second electrodes of the two photodiodes, on the other hand, are connected to the common voltage potential.

After one photo current has been inverted, the two photo currents can simply be brought together in the node to form a differential current. The inverter is arranged after the summation point in which the reference current is superimposed on the respective reference current. In other words, the inverter acts on the sum of the reference current and the respective photo current.

In the inverter, the first electrode of the second photo diode is preferably connected to an inverting input of a first operational amplifier whose output is connected by way of a first resistor to the inverting input of the first operational amplifier and by way of a second resistor of equal magnitude to the node. The choice of identical resistors has the result that a current of equal magnitude and reverse polarity is generated.

The node to which the two photo currents as well as the reference current which is alternatingly superimposed on one of the photo currents are directed lies at the input of an integrator which generates an integrator signal at its output. In a preferred embodiment, the differential current passing through the node is directed to the inverting input of a second operational amplifier which is configured as an integrator whose output is connected to the inverting input by way of a capacitor that is charged or discharged by the differential current.

In a comparator, the integrator signal produced by the integrator is compared to a cyclic ramp signal whose cycle period corresponds to the aforementioned period which equals the sum of the two time phases. The integrator signal is preferably connected to the first input of a third operational amplifier working in a comparator configuration, receiving the ramp signal at its second input and delivering the preferably rectangular-shaped comparator signal at its output.

The ramp signal is preferably generated by means of a first counter which within the length of a period counts up from a starting value to an end value and then resets. In a ramp generator, the digital output signal is converted into a corresponding voltage. The ramp signal runs cyclically through a voltage range within which the integrator signal can be found. With the ramp signal, it is therefore possible to determine the point to which the integrator signal has moved within the voltage range. Every time the point is reached where the integrator signal and the ramp signal intersect each other, the output signal of the comparator is switched. At the end of the period, when the ramp signal is reset, the output signal of the comparator is likewise reset. As a result, the output signal of the comparator is a rectangular-shaped signal whose duty cycle ratio depends on the output signal of the integrator and therefore on the difference of the two photo currents. The comparator signal is a so-called pulse-width modulated (PWM) signal.

The pulse-width modulated signal is connected to the controlling input of the switch, so that the reference current is alternatingly superimposed on the first and the second photo current as dictated by the duty cycle ratio. When the integrator signal is proportional to the difference of the photo currents, at the intersection of the integrator signal and the ramp signal, a duty cycle ratio is reached where the sum of the first photo current with the reference current added during the first time phase on the one hand and the sum of the second photo current with the reference current added during the second time phase on the other hand compensate each other completely. Without any further movement of the light barrier vane which is connected to the measurement lever of the balance, the integrator signal would remain unchanged.

In a balance with electromagnetic force compensation according to the invention, the pulse-width modulated comparator signal is used to return the light barrier vane to a starting position where the light produced by a light source, for example a light-emitting diode, is received by the two photodiodes preferably in equal parts.

The balance with electromagnetic force compensation includes a cantilevered extension from which a force that is being measured can be transmitted by way of a coupling member to a first end section of a pivotally supported measurement lever whose second end section holds on the one hand a coil immersed in a magnetic field and on the other hand a light barrier through which light passes from a light source to a pair of photodiodes that are arranged one above the other.

The photo currents generated by the photodiodes are fed as controlling quantities to the differential measurement circuit which is part of a controller device. The preferably pulse-width modulated comparator signal or an equivalent analog control signal corresponding to the photo currents is sent to an analog controller or, with particular preference, a digital control signal is sent to a digital controller.

As mentioned above, the length of the period of the comparator signal that is used to switch the photo currents is counted out preferably by means of a first counter. The target for the duty cycle ratio is at 50/50, i.e. the point where the polarity change occurs halfway up the ramp or in the middle of the period length of the comparator signal. In the target state for the duty cycle ratio, the difference in length between the phases is zero and, accordingly, the difference between the two time phases can likewise be regulated towards this target, i.e. towards zero.

As the system always aims to return the light barrier and the comparator signal back to the target state, the deviation from the target state represents the control variable.

In order to form a digital control variable, the number of counting steps after the polarity change until the target value has been reached is counted with a second counter or, if a displacement of the light barrier occurs in the opposite direction, the number of counting steps is counted from the target state to the occurrence of the polarity change. With a second counter, a digital measurement quantity that is proportional to the displacement of the light barrier can be derived from the difference between the time phases $t_1$, $t_2$ of the period, from a fraction or multiple of the difference, or in some other way.

In the preferred embodiment of the invention, the preferably digital controller which normally includes a comparator element and a controller element calculates a digital reference quantity which is used to return the control variable to the target value. The comparator element can be omitted in this case, as the target value or the stationary value of the control variable is zero and the correcting quantity presented to the controller element is equal to the difference from the target value.

The controller element, which operates preferably as a PID controller, receives the difference from the target value, i.e. the information as to whether and by how much the control variable deviates from the target, as input and calculates a digital output quantity which corresponds to the deviation from the target and to the weight change and which is superimposed on a stored digital reference quantity which corresponds to the weight that was measured before the weight change.

In a D/A converter arranged downstream, the updated digital reference quantity is converted into a corresponding analog response quantity for which a corresponding compensation current is generated in a driver circuit and sent through the coil.

The magnetic force that is thereby generated counterbalances the force that is to be measured, so that the measurement lever is brought back to its initial position where the light coming from the light source falls in equal parts on the two photodiodes. In this position, the deviation from the control target has returned to zero.

When the amount of weight resting on the balance changes for example by one percent, the light barrier is displaced, with the result that there will now be a difference in the photo currents which is compensated by a change in the digital reference quantity. For example, with a weight of 1000 grams on the weighing pan the digital reference quantity may have a binary value of 1111101000. With a deviation of 1%, i.e. when the weight is increased by 10 grams, the result is a corresponding deviation from the control target, and the controller in the configuration of a proportional controller calculates a digital controller output quantity in the amount of 1010. This digital controller output quantity is taken into account in the digital reference quantity which is increased accordingly to 1111110010 after the weight change.

The controller is preferably a computer in which an operating program is implemented for the control of the measurement processes. In the calculation of the digital reference quantity the controlled measurement process is preferably taken into account. For example, if a weight change of one percent is anticipated, the digital reference quantity is already in advance adjusted by 0.5%, i.e. from 1111101000 to 1111101101, and set to its final value after the weight change has taken place.

It is further possible to set filters through which the digital measurement quantities can be filtered. The filter parameters can also be chosen in anticipation of impending changes, so that filter processes will take less time or that signal shapes will be optimized.

In a further preferred embodiment, the controller is connected to at least one sensor which serves to measure an interfering quantity which is taken into account in the calculation of the digital reference quantity. To perform this function, the controller is preferably equipped with software routines designed to address the specific interference factors.

As a result, the balance with electromagnetic force compensation in accordance with the invention can be adapted to influence factors associated with the environment and with the measurement process which affect the operation of the controller, so that the best possible measurement results are achievable.

BRIEF DESCRIPTION OF THE DRAWINGS

In the following, the invention will be explained in more detail by referring to the drawings, wherein.

DETAILED DESCRIPTION

Figure 1:
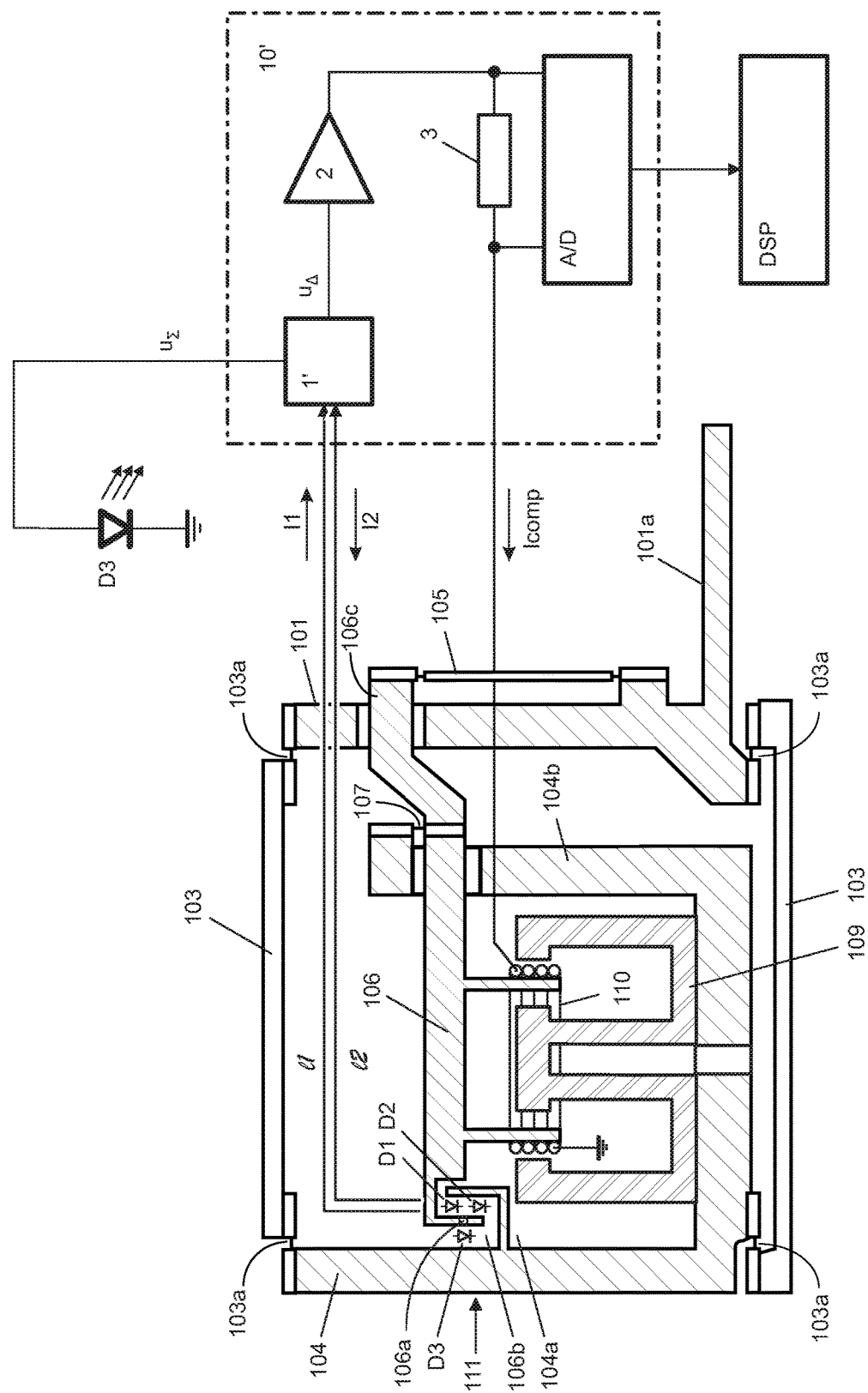
FIG. 1 illustrates the balance with electromagnetic force compensation according to the prior art disclosed in [1], DE 101 53 603 A1, as described hereinabove.
Figure 2A:
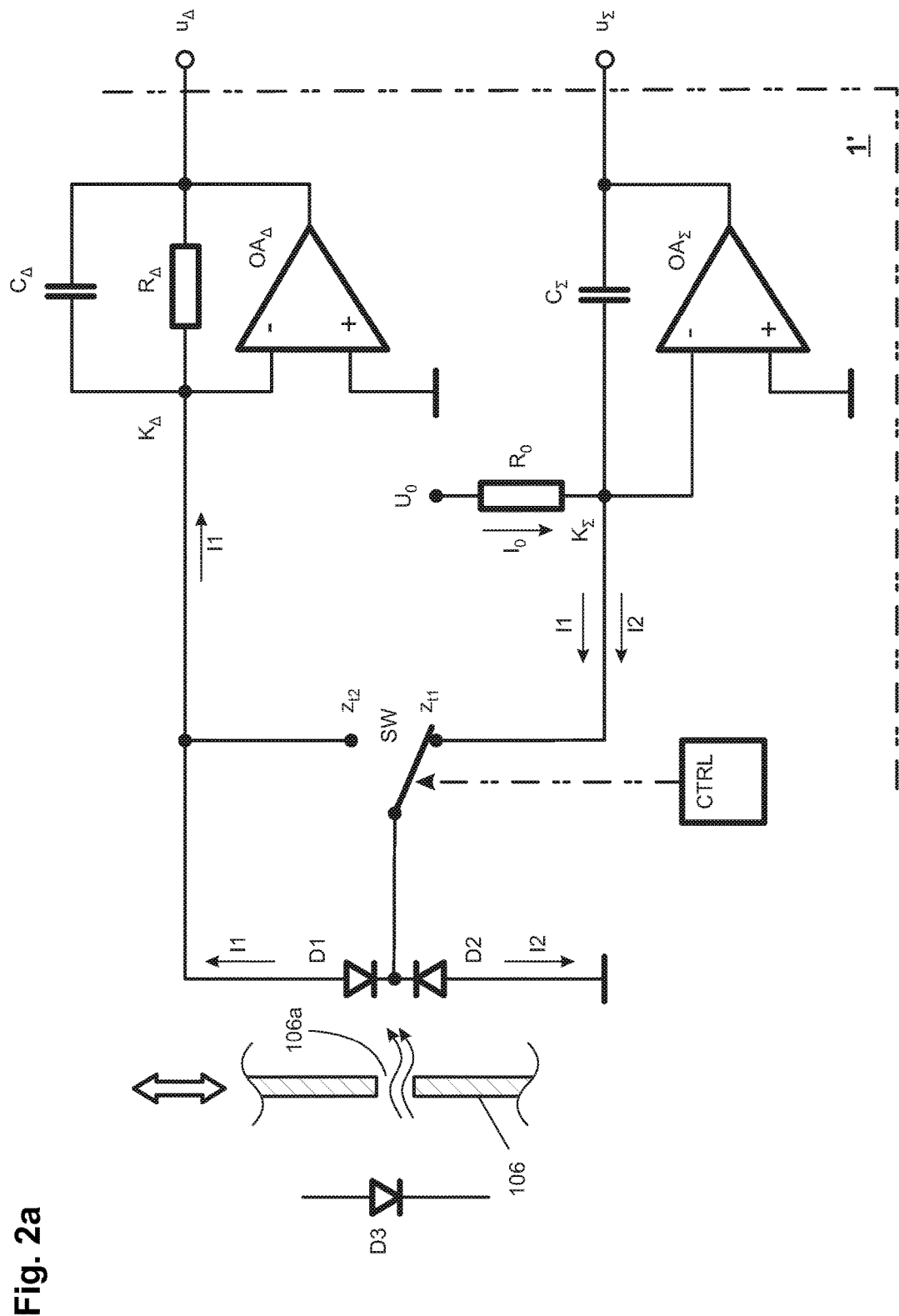
FIG. 2a illustrates the differential measurement circuit 1' of the balance of FIG. 1 as described hereinabove with a switch SW in a first position where only the photo current $I_1$ of a first photodiode D1 is processed in the differential measurement circuit 1'.
Figure 2B:
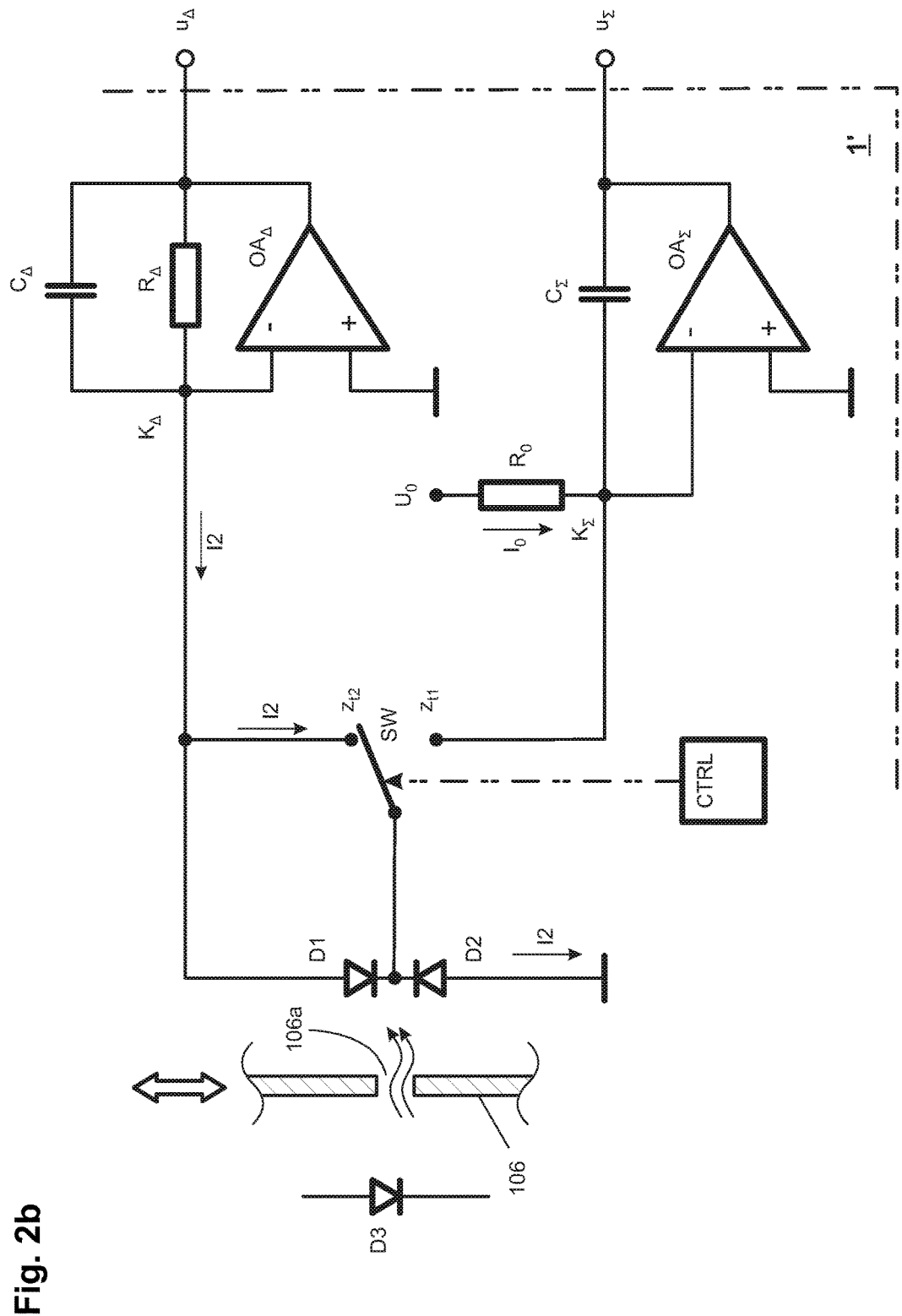
FIG. 2b shows the differential measurement circuit 1' of FIG. 2a with the switch SW in a second position where only the photo current $I_2$ of a second photodiode D2 is processed in a differential measurement circuit 1'.

The balance with electromagnetic force compensation shown in FIG. 1 as well as the differential measurement circuit 1' shown in FIGS. 2a and 2b have been described herein at the beginning.

Figure 3A:
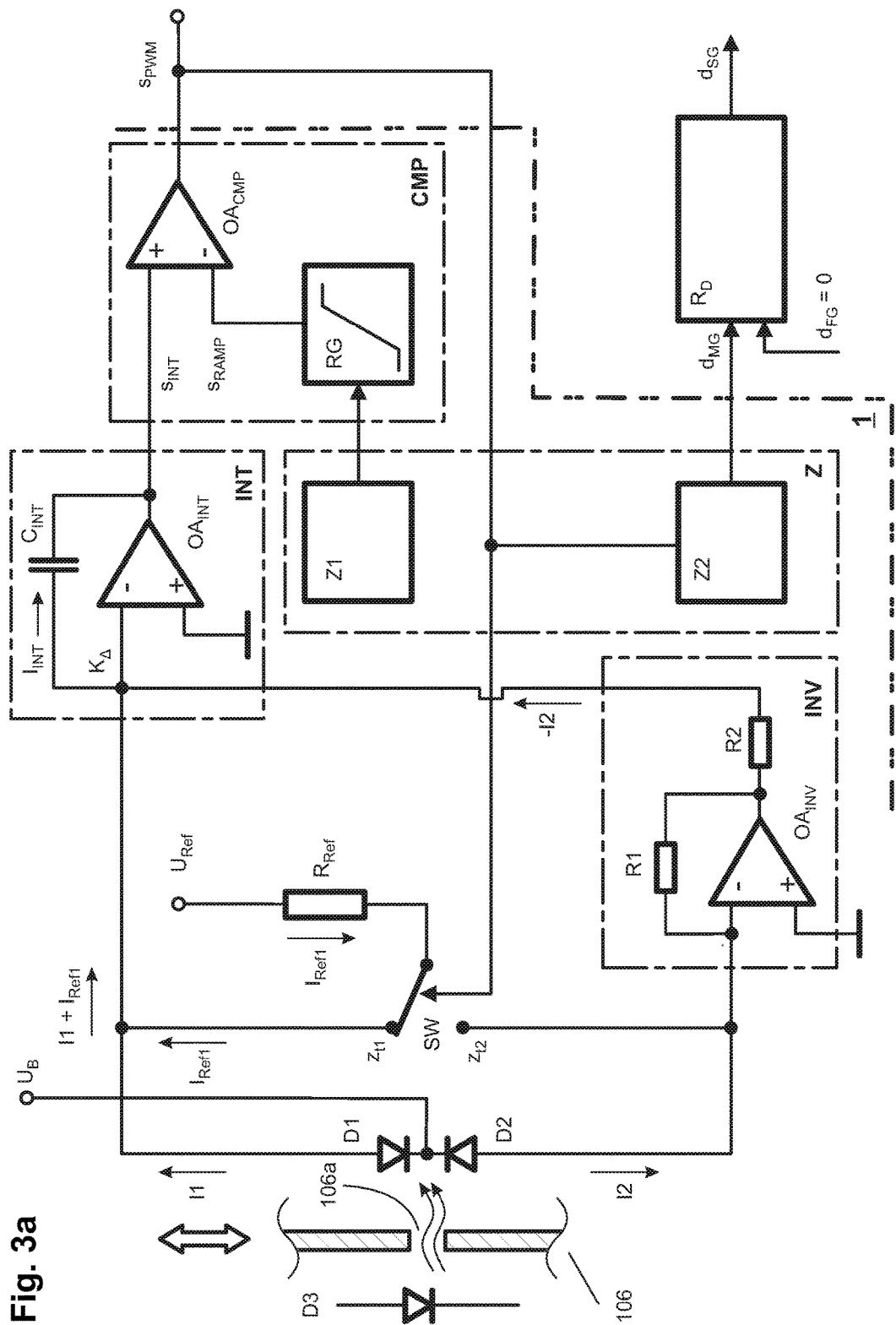
FIG. 3a illustrates the differential measurement circuit 1 according to the invention with two photodiodes D1, D2 from which one photo current $I_1$ flows directly and one photo current $I_2$ flows by way of an inverter INV to a node $K_A$, and further with a switch SW which superimposes a reference current $I_{ref}$ alternatingly as $I_{ref1}$, $I_{ref2}$ on the first and second photo current $I_1$, $I_2$ within the length of a period.
Figure 5:
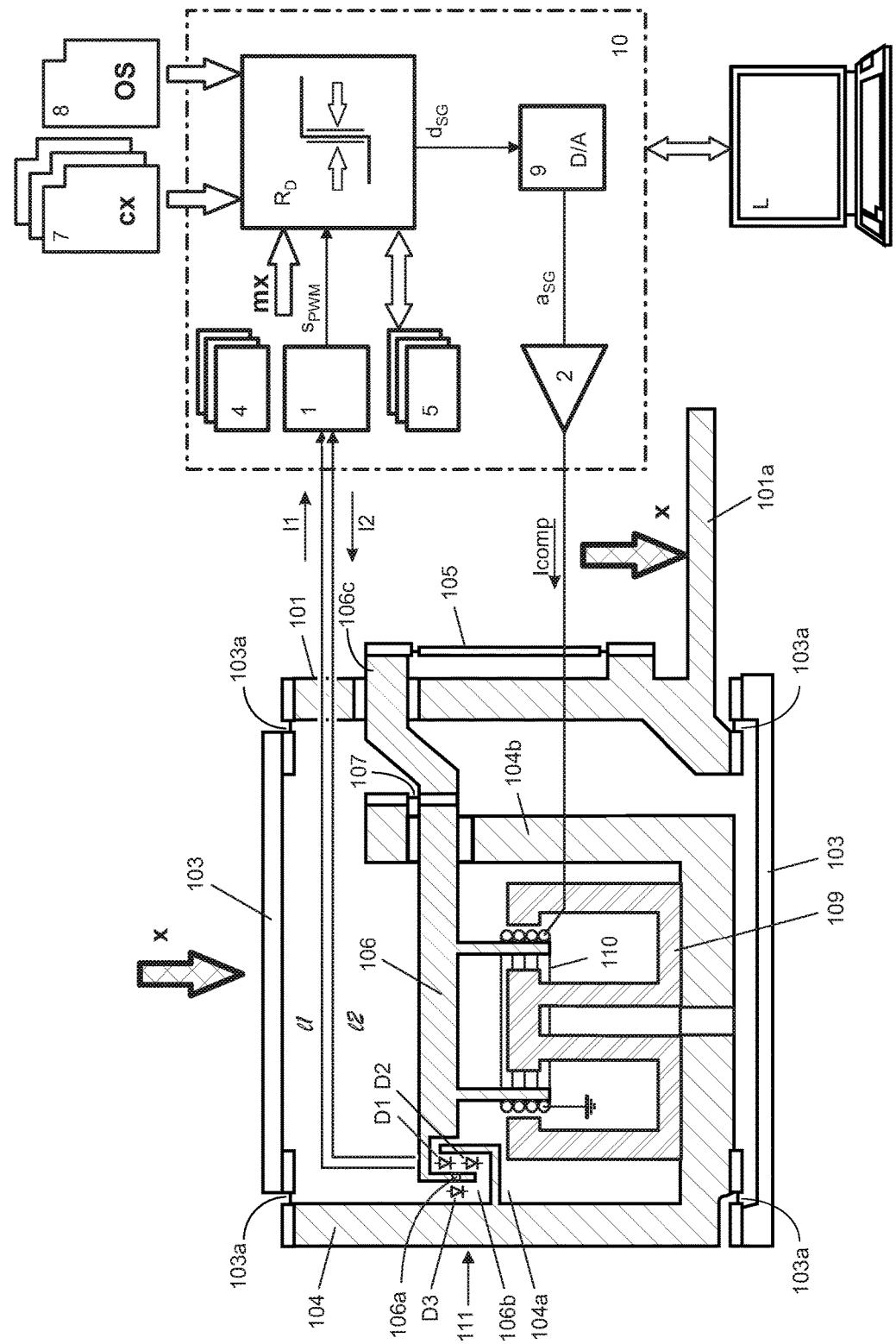
FIG. 5 illustrates a balance with electromagnetic force compensation according to the invention, with a controller unit 10 that includes the differential measurement circuit 1 of FIG. 3a receiving the photo currents $I_1$ and $I_2$ as input variables and generating a pulse-width modulated signal $s_{PWM}$ which is sent to a digital controller $R_D$.

FIG. 3a shows a differential measurement circuit 1 according to the invention which is used in the balance with electromagnetic force compensation of FIG. 5 as part of the controller unit 10.

The differential measurement circuit 1 of FIG. 3a includes two photodiodes which receive light originating from a light source D3, preferably a light-emitting diode, and passing through an opening 106a of a movable light barrier which is arranged at a second end section 106b of a pivotally supported measurement lever 106, as has already been described in reference to FIG. 1. In the starting position of the light barrier, the light is distributed evenly between the two photodiodes D1 and D2, so that the latter send photo currents $I_1$ and $I_2$ of equal magnitude through conductors I1, I2. When a change in the force acting on the measurement lever 106 causes a displacement of the light barrier, the photodiodes D1, D2 receive unequal amounts of light and as a result, unequal photo currents $I_1$ and $I_2$ are sent through the conductors I1, I2.

The cathodes of the photodiodes D1 and D2 are permanently connected to a common voltage potential $U_B$ rather than being connected to a switch as was the case in the circuit arrangement of FIG. 2a. The photodiodes D1 and D2 can therefore work under stable conditions in a selected operating range. The cathodes of the photodiodes D1 and D2 are preferably connected to a positive voltage potential $U_B$, i.e., a positive bias voltage or reverse bias voltage, so that the photodiodes D1 and D2 are operating in the reverse-biased mode. From the anode of the first photodiode D1, a first photo current $I_1$ is flowing directly to a node $K_A$. From the anode of the second photodiode D2, a second photo current $I_2$ is flowing by way of an inverter INV to the node $K_A$. The inverter INV reverses the polarity of the second photo current $I_2$ on which a reference current $I_{Ref2}$ can be superimposed.

In the inverter circuit, the second photo current $I_2$ is directed to the inverting input of a second operational amplifier $OA_{INV}$, whose output is connected by way of a first resistor R1 to the inverting input and by way of a second resistor R2 to the node $K_A$.

The second photo current $I_2$ flows through the first resistor R1 and as a result there is a voltage in the amount of $I_2*R1$ across the resistor R1. Since the first as well as the second resistor R1, R2 have one end connected to virtual mass, the voltage potential across the second resistor R2 is the same as across R1. Since the resistors R1, R2 are of the same magnitude but are connected to mass at opposite ends, the current flowing in the resistor R2 has the same magnitude as the current flowing in the resistor R1, but the opposite sign. The second photo current $I_2$ therefore flows with reverse polarity to the node $K_A$.

The switch SW, which is flipped once forward and back again in each period, has the effect that during a first time phase $t_1$ with the switch in position $z_{t1}$ a reference current $I_{Ref1}$ is superimposed on the first photo current $I_1$. During a second time phase $t_2$ with the switch in position $z_{t2}$ the reference current $I_{Ref2}$ is superimposed on the second photo current $I_2$.

The symbolically represented toggle contact of the switch SW, which is configured preferably as a semiconductor switch, is connected to a reference voltage $U_{Ref}$ by way of a reference resistor $R_{Ref}$. The reference current $I_{Ref}$ is therefore determined by the quotient $U_{Ref}/R_{Ref}$. Both points at which the reference currents $I_{Ref1}$, $I_{Ref2}$ are superimposed on the respective photo current $I_1$ or $I_2$, are connected to virtual mass, so that in both positions of the switch SW the voltage across $R_{Ref}$ is $U_{Ref}$ and the two reference currents $I_{Ref1}$, $I_{Ref2}$ are identical and can therefore be referred to as a single reference current $I_{Ref}$.

Since there is no switching between the photo currents $I_2$ and $I_2$ and, instead, the reference current $I_{Ref}$ is being switched, the operating conditions are more stable, which opens up the advantageous possibility of using an operating voltage of the circuit arrangement instead of a reference voltage source for the reference voltage $U_{Ref}$.

The node $K_A$ lies at the input of an integrator INT, specifically at the inverting input of a second operational amplifier $OA_{INT}$ which is part of the integrator and whose output is connected to the node $K_A$ by way of a capacitor $C_{INT}$. Thus, the respective differential currents entering the node during the time phases $t_1$, $t_2$ are flowing into the capacitor $C_{INT}$ as integrator current $I_{INT}$ and are charging or discharging the capacitor $C_{INT}$. If the currents cancel each other mutually at the node $K_A$, the charge of the capacitor $C_{INT}$ and its output signal, i.e. the integrator signal $s_{INT}$ at the output of the second operational amplifier $OA_{INT}$, stays unchanged. With the alternating addition of the reference current $I_{Ref}$ in the two time phases $t_1$, $t_2$, the state where the currents at the node $K_A$ cancel each other should be reached as soon as the integrator signal $s_{INT}$ is proportional to the displacement of the light barrier and to the difference of the photo currents $I_1$, $I_2$, at the time when the integrator signal $s_{INT}$ and the ramp signal $s_{RAMP}$ intersect each other. Thus, the integrator signal $s_{INT}$ needs to be measured and compared to a reference signal. Dependent on the comparison, a corresponding switching signal for the switch SW needs to generated, so that the differential current at the node $K_A$ vanishes when the integrator signal $s_{INT}$ has reached a value that is proportional to the displacement of the light barrier.

To make this comparison, the integrator signal $s_{INT}$ is directed to a comparator CMP, specifically to the non-inverting input of a third operational amplifier $OA_{CMP}$ that is part of the comparator and to whose inverting input a ramp signal $s_{RAMP}$ is applied which preferably corresponds to the voltage range that can be swept by the integrator signal $s_{INT}$. The ramp signal $s_{RAMP}$ is generated by a ramp generator RG which receives at its first input a counter signal of a first counter. The first counter Z1 performs a periodic upward count while the ramp generator RG generates a corresponding analog signal. After the completion of each period, the first counter Z1 is reset and starts a new up-count. As soon as the ramp signal $s_{RAMP}$ reaches the value of the integrator signal, the comparator (i.e. the operational amplifier $OA_{CMP}$) is switched over, so that the result is a pulse-width modulated comparator signal $s_{PWM}$ at the output of $OA_{CMP}$.

The comparator signal $s_{PWM}$ is then directed to the controlling input of the switch SW, so that the time phases $t_1$, $t_2$ in which the reference current is superimposed on the respective photo current $I_1$, $I_2$ continue to be adjusted until the difference between the currents arriving at the node $K_A$ is zero on average and the charges flowing into and out of the capacitor $C_{INT}$ cancel each other.

The comparator signal $S_{PWM}$ is further used for the control of the light barrier. This is accomplished with a digital measurement quantity or position-restoring quantity which is derived from the comparator signal $s_{PWM}$ in a second counter Z2. The second counter Z2 counts for example the number of steps from the occurrence of the polarity change until the target position of the light barrier has been reached or, if a displacement of the light barrier has occurred in the opposite direction, the number of steps from the detection of the target position until the polarity change occurs.

The first and the second counter Z1, Z2 are preferably part of a common counter module Z. For example, the controller $R_D$ mentioned below is realized by means of a processor which includes several counters that are selectively programmable.

After the digital measurement quantity or position-restoring quantity $s_{MG}$ has been determined, it is sent from the output of the differential measurement circuit 1 to the input of a digital controller $R_D$. As the digital reference quantity $d_{FG}$ is preferably equal to zero and the measurement- or position-restoring quantity $s_{MG}$ therefore represents the deviation from the control target and needs to be regulated to zero, it is sent to a controller element which calculates a corresponding digital regulating quantity $d_{SG}$ by means of which the light barrier is returned to the initial position. As explained above, when there is a change in weight, the required change of the regulating quantity $d_{SG}$ is calculated which was previously used for a specific weight to bring the light barrier back to the initial position. The regulating quantity calculated by the controller $R_D$ is thus added to a stored regulating quantity which corresponds to the weight and which was measured before the weight change.

Figure 3B:
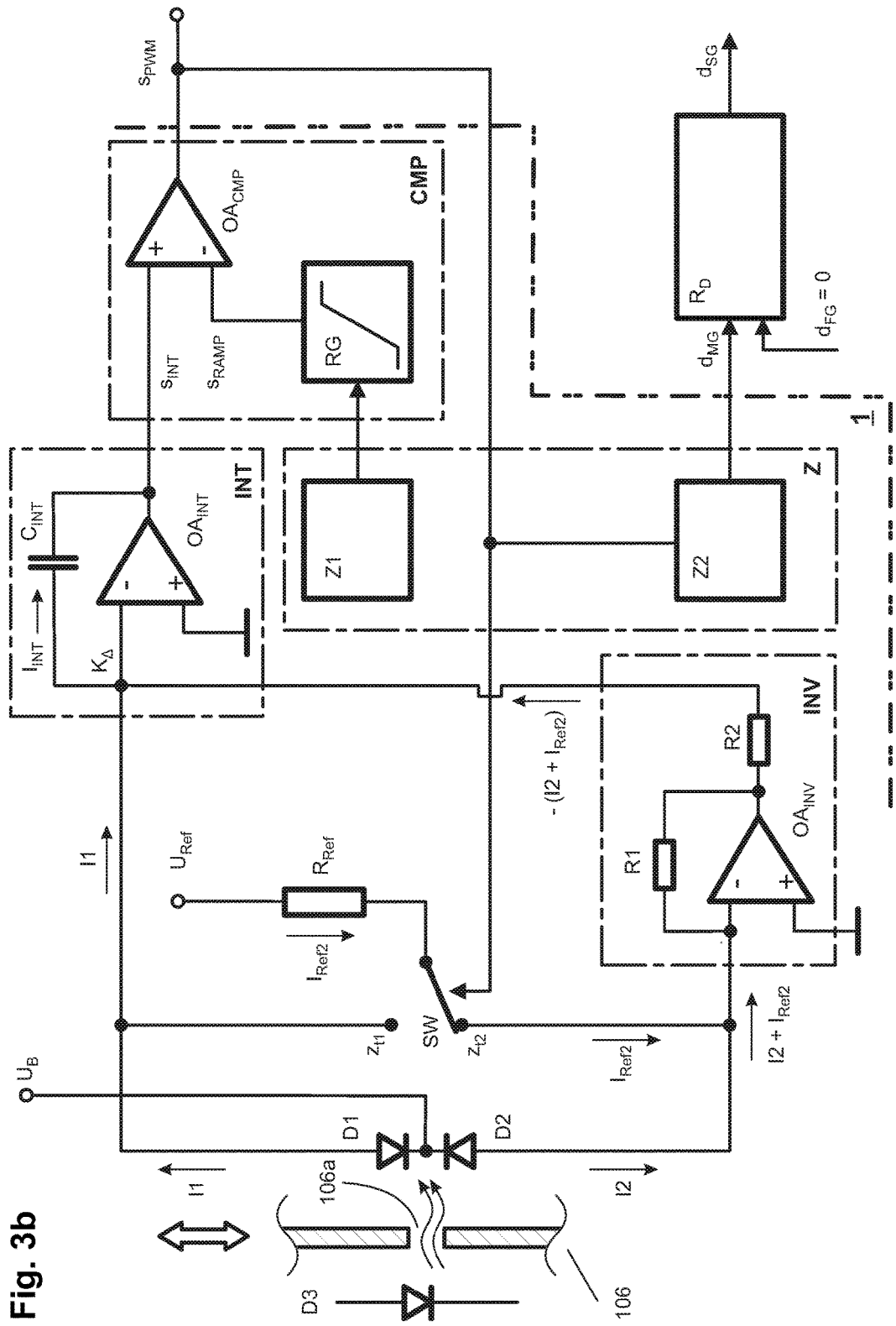
FIG. 3b shows the differential measurement circuit 1 of FIG. 3a with the switch SW in a position where the reference current $I_{ref}$, or in this case $I_{ref2}$, is superimposed on the second photo current $I_2$.

FIG. 3b shows the differential measurement circuit 1 of FIG. 3a with the switch SW in a position in which the reference current $I_{Ref2}$ or $I_{Ref}$ is superimposed on the second photo current $I_2$. The sum of the second photo current $I_2$ and the reference current $I_{Ref}$ is now sent to the inverter and is delivered at the output of the latter in the inverted state.

Figure 4:
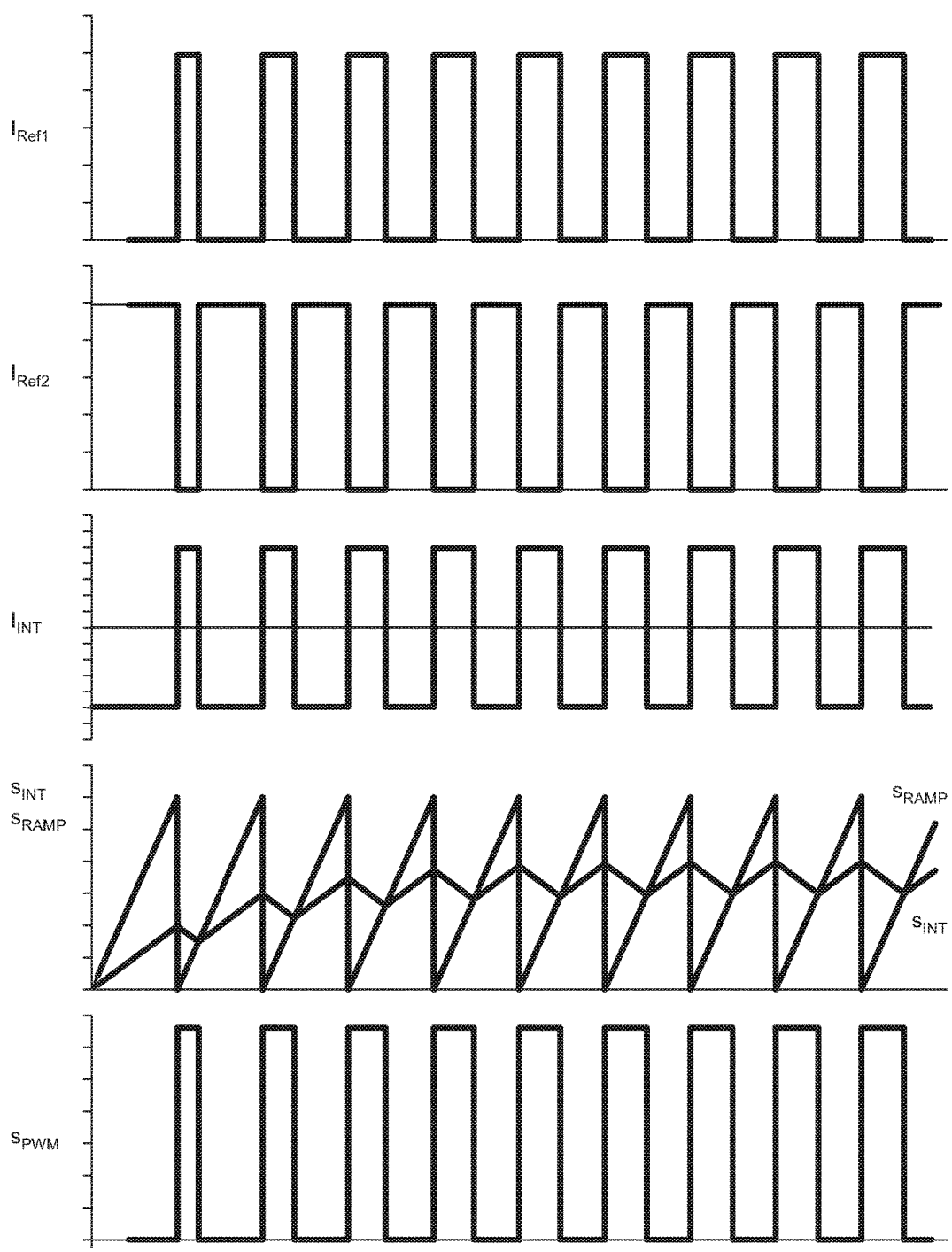
FIG. 4 represents the time profiles of currents and signals which occur in the differential measurement circuit 1 of FIG. 3a under ideal operating conditions.

FIG. 4 illustrates time profiles of currents and signals which occur in the differential measurement circuit 1 of FIG. 3a. Shown in the first two diagrams are the reference currents $I_{Ref1}$, $I_{Ref2}$ which are superimposed on the first and the second photo current $I_1$, $I_2$ by alternatingly flipping the switch SW. The third diagram shows the time profile of the integrator current $I_{INT}$. The forth diagram shows the integrator signal $s_{INT}$ and the periodic, saw-tooth shaped ramp signal $s_{RAMP}$. The last diagram shows the rectangular-shaped and pulse-width modulated comparator signal $s_{CMP}$. Rising flanks occur when the ramp signal $s_{RAMP}$ is declining, and falling flanks occur when the ramp signal $s_{RAMP}$ crosses the value of the integrator signal $s_{INT}$.

As the diagrams illustrate, when a deviation from the control target has occurred, it is corrected by the regulation, and the pulse-width modulated comparator signal $s_{CMP}$ as well as the two first signals $I_{Ref1}$, $I_{Ref2}$ which depend on $s_{CMP}$ are regulated towards a duty cycle ratio of 50/50. Consequently, the integrator current $I_{INT}$ likewise changes accordingly. The integrator signal $s_{INT}$ rises and ends up at about one-half of the height of the ramp signal $s_{RAMP}$, with the result that the pulse-width modulated comparator signal $s_{CMP}$ returns to a duty cycle ratio of 50/50.

FIG. 5 shows a balance with electromagnetic force compensation according to the invention with a controller unit 10 that includes the differential measurement circuit 1 of FIG. 3a receiving the photo currents $I_1$ and $I_2$ as control variables and generating a pulse-width modulated signal $s_{PWM}$ which is sent to a digital controller $R_D$ performing the tasks described above.

In this configuration of the circuit arrangement, the preferably pulse-width modulated signal $s_{PWM}$, rather than the deviation from the control target, is transmitted to the controller $R_D$. Therefore, the expanded processor-controlled regulating unit $R_D$ determines the deviation from the control target for example as described above and calculates a digital regulating variable $d_{SG}$ which is passed on to a D/A converter 9. The latter transmits a corresponding analog regulating variable $a_{SG}$ to a driver circuit 2 which causes a compensation current $I_{comp}$ to flow through the compensation coil 110.

In preferred embodiments according to the invention, the processing of signals in the control loop of FIG. 5 includes input information which can affect the measurement process and is not derived directly from a displacement of the light barrier or angular deflection of the measurement lever 106, but comes from other sources of information.

Disturbances x affecting the balance are detected by means of sensors 4, and corresponding measurement signals mx are sent to the controller $R_D$. To deal with these disturbances, software routines 7 are stored in the controller with instructions for taking appropriate countermeasures in the control loop.

Disturbances x affecting the regulation process can also be caused by movements of the measurement objects. These movements of the measurement objects can also be detected by sensors 4 and can be addressed by operating programs in the balance or in a central computer L.

The individual control parameters are preferably controlled by taking the aforementioned extraneous effects of disturbances appropriately into account. If a PID controller is used, the respective weight factors of the P, I and D component are appropriately adjusted. Furthermore, an anticipatory control excursion can be applied, by means of which an expected weight change is compensated.

Furthermore, digital filters 5 can be employed, or their respective filter parameters can be adjusted for the filtering of the signals that are processed in the digital controller $R_D$.

What is claimed is:

1. A differential measurement circuit for a balance with electromagnetic force compensation having a compensation coil, the circuit being arranged to receive, as inputs, two photo currents ($I_1$, $I_2$) generated by two photodiodes (D1, D2) and to generate from the inputs an output signal that is proportional to a difference between the photo currents, the circuit comprising:

a switch (SW), arranged to be flipped between two states ($z_{t1}$, $z_{t2}$) within two phases ($t_1$, $t_2$) of a time period (T) to control the flow of current through a node ($K_A$) to which the two photo currents ($I_1$, $I_2$) are directed, wherein the switch (SW) is further arranged to be controlled such that a reference current ($I_{Ref}$) delivered to the switch from a voltage or current source ($U_{Ref}$) is superimposed alternately within the time phases ($t_1$, $t_2$) on one of the two photo currents ($I_1$, $I_2$) which continuously flow into the node ($K_A$); and wherein the node ($K_A$) lies at an input of an integrator (INT), which generates an integrator signal ($s_{INT}$) that is compared, as an input signal to a comparator (CMP) to a cyclically recurring ramp signal ($s_{RAMP}$) which conforms to the time period (T), such that the comparator generates as an output thereof a rectangular-shaped pulse-width modulated signal ($s_{PWM}$), a duty cycle ratio of which is defined by the intersection of the integrator signal ($s_{INT}$) with the ramp signal ($s_{RAMP}$), with the pulse-width modulated signal, through feedback, compensating two functions:

when directed to a control input of the switch, the photo current is compensated so that the reference current is alternately superimposed on the first and second photo current as dictated by the duty cycle ratio; and when directed as a compensation current to the compensation coil, the load force is compensated.

2. The circuit of claim 1, wherein:

the first electrode of the first photo diode (D1) is connected directly to the node ($K_A$);

the first electrode of the second photodiode (D2) is connected to the node ($K_A$) by way of an inverter (INV) in which the second photo current ($I_2$) is inverted; and the respective second electrodes of the two photodiodes (D1, D2) are connected to a common voltage potential $U_B$.

3. The circuit of claim 2, further comprising a first operational amplifier ($OA_{INV}$) in the inverter (INV), an inverting input of the first operational amplifier ($OA_{INV}$) connected to the first electrode of the second photo diode (D2), and with an output of the first operational amplifier ($OA_{INV}$) connected, through a first resistor (R1), to the inverting input and, through a second resistor (R2) of equal magnitude, to the node ($K_A$).

4. The circuit of claim 3, further comprising a second operational amplifier ($OA_{INT}$) working in an integrator circuit, an inverting input of the second operational amplifier ($OA_{INT}$) being connected to the node ($K_A$) and the output of the second operational amplifier ($OA_{INT}$) being connected through a capacitor ($C_{INT}$) to the inverting input, to deliver the integrator signal ($s_{INT}$).

5. The circuit of claim 4, further comprising a third operational amplifier ($OA_{CMP}$) working in a comparator circuit, a first input of the third operational amplifier ($OA_{CMP}$) receiving the integrator signal ($s_{INT}$), a second input of the third operational amplifier ($OA_{CMP}$) receiving the ramp signal ($s_{RAMP}$) and an output of third operational amplifier ($OA_{CMP}$) delivering the comparator signal ($s_{PWM}$).

6. The circuit of claim 5, further comprising a first counter which for the duration of a period T counts from an initial value upward to an ending value and is then reset, thereby generating the ramp signal ($s_{RAMP}$).

7. The circuit of claim 6, wherein a digital measurement quantity ($d_{MG}$) which is at least approximately proportional to the displacement of the movable light barrier is obtained, and based on either: the difference of the time phases $t_1$, $t_2$ of the period T or a part thereof, preferably by means of a second counter, or the duty cycle ratio of the comparator signal ($s_{PWM}$).

8. The circuit of claim 7, wherein a controller ($R_D$) receives the digital measurement quantity ($d_{MG}$) as a deviation from a control target and generates a corresponding digital regulating quantity ($d_{SG}$) as a means for returning the movable light barrier towards an initial position between the two photodiodes (D1, D2).

9. The circuit of claim 7, further comprising:
a digital-to-analog converter (9) receives the digital regulating quantity ($d_{SG}$) which delivers a corresponding analog regulating quantity ($a_{SG}$) to a driver circuit (2), causing a compensating current ($I_{comp}$) proportional to the analog regulating quantity ($a_{SG}$) to flow through a coil (110) which is movable in a magnetic field, held by a pivotally supported measurement lever (106) with a first end section (106c) where the force to be measured can be applied and a second end section (106b) where the movable light barrier is arranged.

10. The circuit of claim 2, wherein the voltage- or current source ($U_{Ref}$) is an operating voltage source of the differential measurement circuit that is also used for other components.

11. The circuit of claim 1, further comprising a light source arranged so that the radiation therefrom reaches the photo diodes (D1, D2) by passing through a movable light barrier.

12. The circuit of claim 11, wherein the light source is a light-emitting diode.

13. A balance operating under an electromagnetic force compensation principle, comprising:
a cantilevered extension from which a force is measured;
a pivotally supported measurement lever having first and second end sections,
a coupling member that transmits the measured force to the first end section
a coil, on the second end section, supported in a magnetic field;
a light source;
a pair of photodiodes, arranged one above the other;
a light barrier vane, supported on the second end section, positioned between the light source and the pair of photodiodes, such that light from the light source passes through the light barrier vane and onto the pair of photodiodes, where each photodiode generate a photo current; and
a differential measurement circuit according to claim 1, wherein the pair of generated photo currents are used as a controlling input variable, the differential measurement circuit arranged in a controller device, the differential measurement circuit operable to generate a corresponding digital comparator signal ($s_{PWM}$) for which a corresponding digital regulating quantity ($d_{SG}$) is calculated in a controller ($R_D$) and wherein said digital regulating quantity ($d_{SG}$) is converted in a digital-to-analog converter into a corresponding analog regulating quantity ($a_{SG}$) for which a corresponding compensation current ($I_{comp}$) can be generated in a driver circuit (2) and sent through the coil.

14. The balance of claim 13, wherein the controller ($R_D$) is a computer in which an operating program is implemented through which measurement processes can be controlled, wherein the digital regulating quantity ($d_{SG}$) can be calculated by taking the controlled measurement processes into account.

15. The balance of claim 13, wherein the controller ($R_D$) is connected to sensors by means of which disturbances (x) affecting the balance can be quantitatively detected, and that subroutines are implemented in the controller ($R_D$) through which the digital regulating quantity ($d_{SG}$) can be calculated by taking the disturbances into account.

16. The balance of claim 13, wherein the controller ($R_D$) is a PID-controller equipped with an appropriately configured regulating element.

17. The circuit of claim 1, further comprising a first operational amplifier ($OA_{INV}$) in the inverter (INV), an inverting input of the first operational amplifier ($OA_{INV}$) connected to the first electrode of the second photo diode (D2), and with an output of the first operational amplifier ($OA_{INV}$) connected, through a first resistor (R1), to the inverting input and, through a second resistor (R2) of equal magnitude, to the node ($K_A$).

18. The circuit of claim 17, further comprising a second operational amplifier ($OA_{INT}$) working in an integrator circuit, an inverting input of the second operational amplifier ($OA_{INT}$) being connected to the node ($K_A$) and the output of the second operational amplifier ($OA_{INT}$) being connected through a capacitor ($C_{INT}$) to the inverting input, to deliver the integrator signal ($s_{INT}$).

19. The circuit of claim 18, further comprising a third operational amplifier ($OA_{CMP}$) working in a comparator circuit, a first input of the third operational amplifier ($OA_{CMP}$) receiving the integrator signal ($s_{INT}$), a second input of the third operational amplifier ($OA_{CMP}$) receiving the ramp signal ($s_{RAMP}$) and an output of third operational amplifier ($OA_{CMP}$) delivering the comparator signal ($s_{PWM}$).

* * * * *